United States Patent [19]
Wigsten

[11] Patent Number: 5,853,341
[45] Date of Patent: Dec. 29, 1998

[54] LAMINATED CHAIN TENSIONER ARMS OR GUIDES

[75] Inventor: Mark M. Wigsten, Lansing, N.Y.

[73] Assignee: Borg-Warner Automotive, Inc., Sterling Heights, Mich.

[21] Appl. No.: 823,715

[22] Filed: Mar. 26, 1997

[51] Int. Cl.[6] .................................................... F16H 7/08
[52] U.S. Cl. ........................................ 474/140; 474/101
[58] Field of Search .................................. 474/101, 111, 474/133–138, 140

[56] References Cited

U.S. PATENT DOCUMENTS

| | | | |
|---|---|---|---|
| 4,798,562 | 1/1989 | Matson et al. | 474/101 |
| 4,826,468 | 5/1989 | Friedrichs | 474/101 |
| 4,832,664 | 5/1989 | Gröger et al. | 474/111 |
| 4,921,472 | 5/1990 | Young | 474/111 |
| 5,045,032 | 9/1991 | Suzuki et al. | 474/140 |
| 5,184,983 | 2/1993 | Shimaya et al. | 474/111 |
| 5,286,234 | 2/1994 | Young | 474/111 |
| 5,318,482 | 6/1994 | Sato et al. | 474/111 |

FOREIGN PATENT DOCUMENTS

| | | |
|---|---|---|
| 0 581 219A | 2/1994 | European Pat. Off. . |
| 2276514 | 1/1976 | France . |
| 178043 | 10/1983 | Japan ................................. 474/140 |

OTHER PUBLICATIONS

EPO Search Report for EP Application No. 98300708.

*Primary Examiner*—Thomas R. Hannon
*Attorney, Agent, or Firm*—Sidley & Austin; Greg Dziegielewski

[57] ABSTRACT

The tensioner arms or guides of the present invention are constructed of two or more laminations with a plastic guide portion. These laminations replace the typical die cast aluminum or injection molded plastic bracket.

13 Claims, 3 Drawing Sheets

LAMINATED CHAIN TENSIONER ARMS OR GUIDES

BACKGROUND OF THE INVENTION

The present invention relates to a chain guide or tensioner arm for guiding or tensioning a drive chain. The preferred embodiment of the present invention is directed to a construction of a chain guide and tensioner arm, which provides two or more steel laminations and a plastic guide portion.

In conventional engine timing systems, a tensioner arm is placed together with a tensioner on the slack side of the timing chain and a chain guide is placed on the tight side. Generally, these tensioner arms and chain guides are made of metal, such as aluminum, and a concave part is often formed on the back sides, opposite to the chain contact side, for weight reduction and material savings.

The chain guides of prior art, such as the guide shown in U.S. Pat. No. 4,832,664, are typically constructed using an injection molding process. The process of injection molding utilizes a mold to form the component. The desired material is placed or injected into the mold and allowed to cure. The mold is then removed to reveal the desired component.

The present invention relates to a tensioner arm, or chain guide, made by assembling two or more steel, or a similar material, laminations with a plastic guide portion. The steel laminations replace a die cast aluminum or injection molded plastic bracket. The advantages of the assembly of the present invention over an injection molded plastic bracket include higher stiffness and strength. Similarly, the assembly of steel laminations attached to a plastic guide portion has a cost advantage and a weight and strength advantage over a die cast aluminum bracket.

SUMMARY OF THE INVENTION

The present invention is directed to a chain guide or tensioner arm for guiding or tensioning a drive chain. While the embodiments are described as either a chain guide or tensioner arm, each embodiment has application to either component. Two or more laminations, or plates, are assembled to a plastic guide portion. The plates may be made of steel or a similar material in strength and stiffness. In a first embodiment of the present invention, the plates are attached to the plastic guide portion by a plurality of pins fitting into the apertures of the plates. A tensioner arm is attached to the engine side wall through an aperture through the plates and the plastic guide portion.

In a second embodiment of the present invention, the plates are fitted onto the plastic guide portion by posts molded onto the face. The posts are inserted through elongated apertures within the plates.

The third embodiment of the present invention has multiple stacked and assembled plates. The plates may be assembled either with pins or by a weld. The plate assembly is attached to the plastic guide portion with snap hooks on the face the snap directly into the plate apertures. Alternatively, in the fourth embodiment, the plates are assembled with pins, and the plate assembly is attached to the plastic guide portion with snap hooks on the face sliding over and hooking onto pins fitted into the plate apertures.

In the fifth embodiment of the present invention, plates are attached to the plastic guide portion by molding material, such as nylon, over the plates. There are no pins or hooks in this embodiment.

DETAILED DESCRIPTION OF THE PREFERRED EMBODIMENTS

Figure 1:
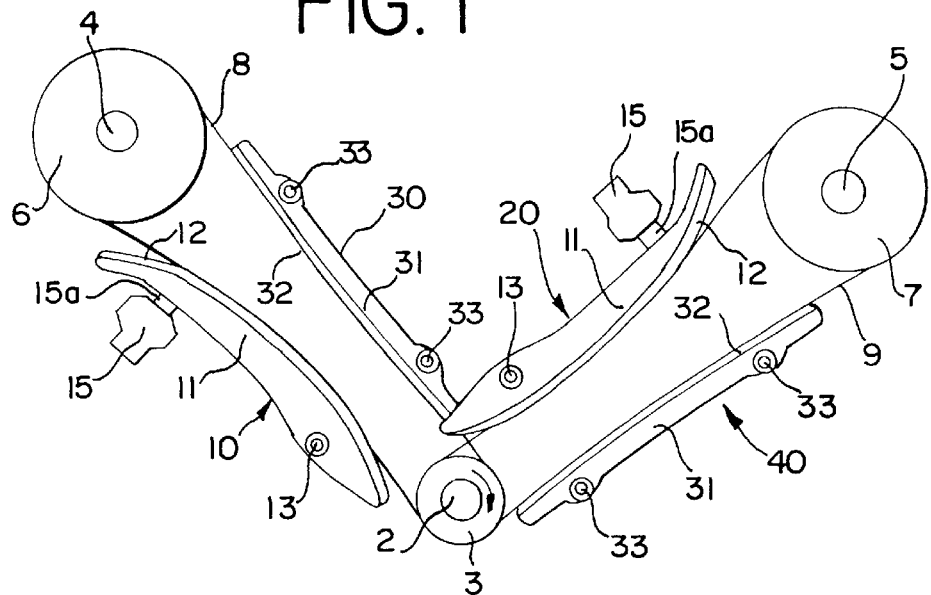
FIG. 1 is a side view of a timing system of a V-engine to which the tensioner arm and chain guide of the present invention may be applied.

FIG. 1 illustrates a V-engine timing system to which the tensioner arm and chain guide of the present invention may be applied. This engine embodiment has two separate engine banks, each of which operates in a similar manner. Each engine bank includes its own camshaft 4 and 5, sprockets 6 and 7, and timing chain 8 and 9. However, the entire engine system has only one crankshaft 2. The engine timing system 1 has two drive sprockets 3, which are attached to a crankshaft 2. The driven sprockets 6 and 7 are attached to camshafts 4 and 5, respectfully. One timing chain 8 is placed around sprockets 3 and 6 and the second timing chain is placed around sprockets 3 and 7, The arrow mark in FIG. 1 indicates the rotational direction of the crankshaft.

Tensioner arms 10 and 20, which are designed to maintain tension on a timing chain, and chain guides 30 and 40, which are designed for guiding and regulating the running position of the timing chain, are placed on the slack side and tight side of the timing chains 8 and 9, respectfully. The tensioner arms 10 and 20 have a main body 11 and a guide portion 12. The guide portion 12 is mounted on the main body 11 on the chain contact side of each tensioner arm 10 and 20. Bolt 13, which provides rotatable support for the arm body 11, is inserted in the aperture formed in one end of the arm body 11. The bolt 13 is fixed with a screw to the side wall of the engine. The hydraulic tensioner 15 is placed on the opposite end of the arm body 11 and its plunger 15a presses the arm body 11 toward the chain contact side.

Similar to the tensioner arms 10 and 20, the chain guides 30 and 40 have a guide body 31 and guide portions 32. The guide portions 32 are mounted on the chain contact side of the guide body 31. The guide body is fixed to the engine side wall by bolts 33 inserted into the apertures at both ends.

Figure 2:
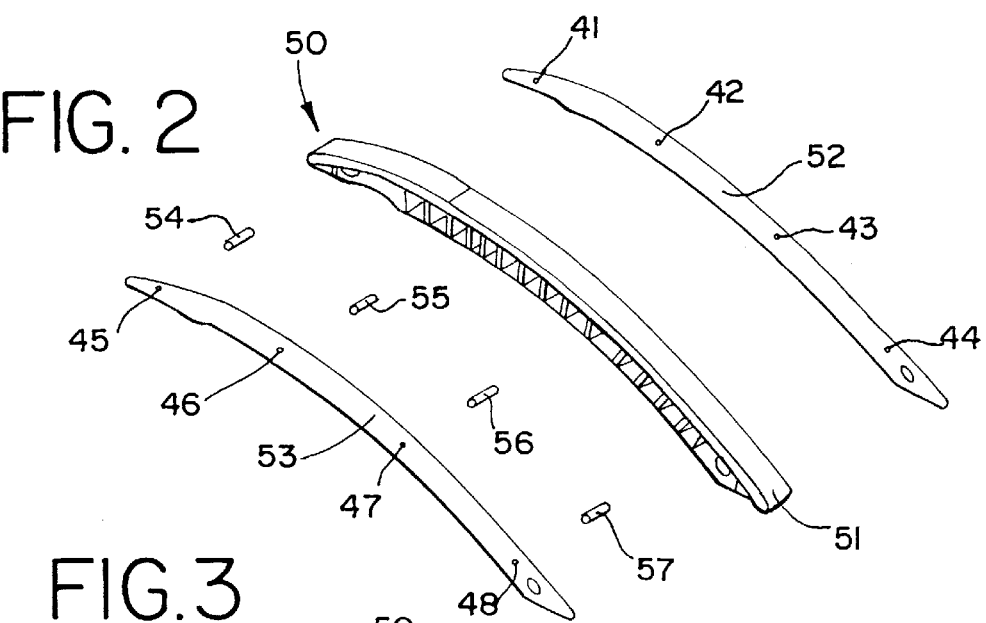
FIG. 2 is an exploded perspective of an assembly of a first embodiment of the tensioner arm of the present invention.
Figure 3:
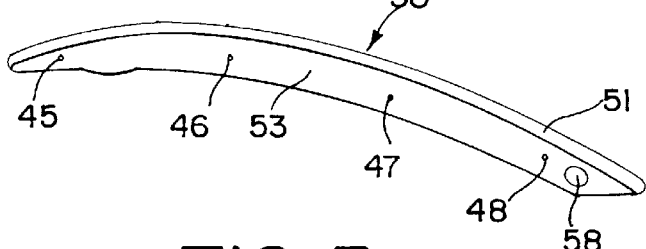
FIG. 3 is a side view of the tensioner arm of FIG. 1.

In the first embodiment of the present invention, as shown in FIG. 2, the tensioner arm 50 has a plastic guide portion 51 and a pair of plates 52 and 53, each plate being connected to a side of the plastic guide portion 51. The plates 52 and 53, made of steel laminates or plates, are attached to the plastic guide portion 51 by a plurality of pins, 54, 55, 56, and 57 inserted and press fit into apertures 41 and 45, 42 and 46, 43 and 47, and 44 and 48, respectively. A side view of the first embodiment is shown in FIG. 3, where the tensioner arm 50 is attached to an engine side wall through an aperture 58.

Figure 4:
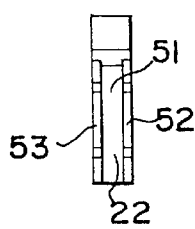
FIG. 4 is a bottom view of an end of the tensioner arm of FIG. 1.
Figure 5:
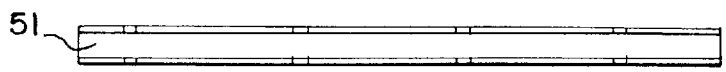
FIG. 5 is a top view of a chain guide or tensioner arm of the present invention.

In FIG. 4, a bottom view, opposite to the chain contact side, of the tensioner arm has a bottom wall 22 and plates 52 and 53, which extend up from the edges, are snug fit against the sides of the guide portion 51. The top view of the guide portion 51 is shown in FIG. 5.

Figure 6:
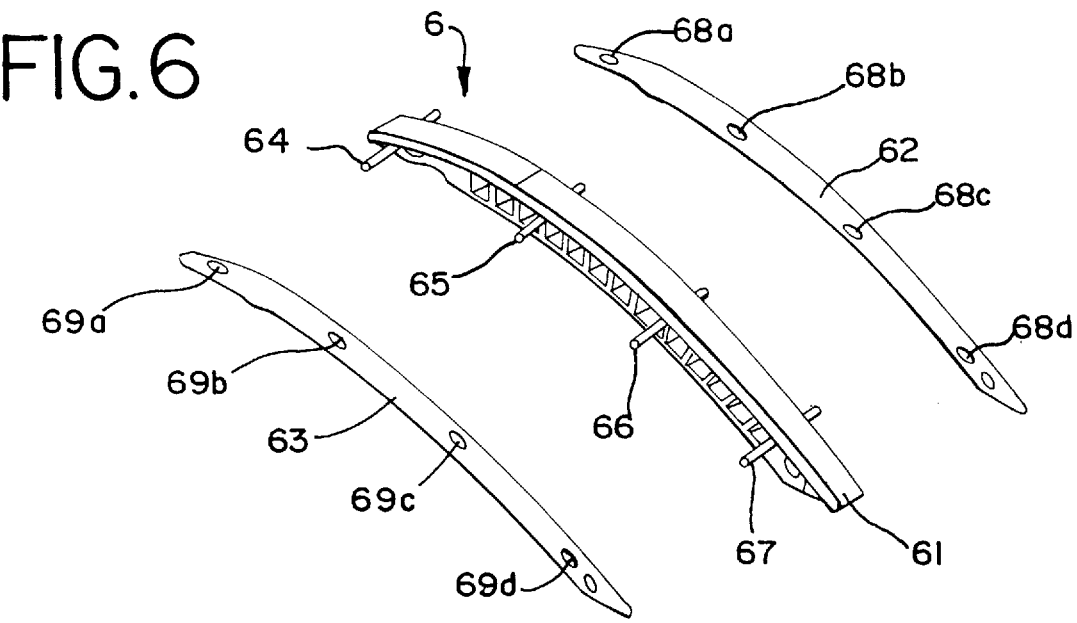
FIG. 6 is an exploded perspective view of an assembly of a second embodiment of the tensioner arm of the present invention.

In a second embodiment of the present invention, as shown in FIG. 6, the tensioner arm 60 has steel laminate plates 62 and 63, a guide portion 61, and posts 64, 65, 66, and 67 molded onto the middle portion of the guide portion 61. The plates 62 and 63 are located on the sides of the guide portion 61 and attached by posts 64, 65, 66, and 67 through elongated apertures 68a, 68b, 68c, and 68d within plate 62 and through elongated apertures 69a, 69b, 69c, and 69d within plate 63.

Figure 7:
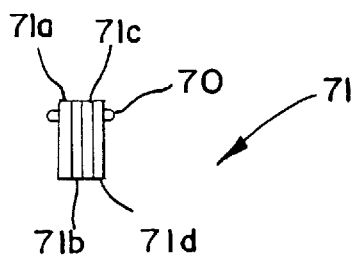
FIG. 7 is a side view of a first assembly of plates of a third embodiment of the present invention.
Figure 8:
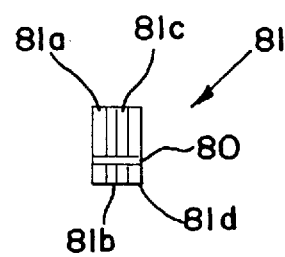
FIG. 8 is a side view of a second assembly of plates of a third embodiment of the present invention.
Figure 9:
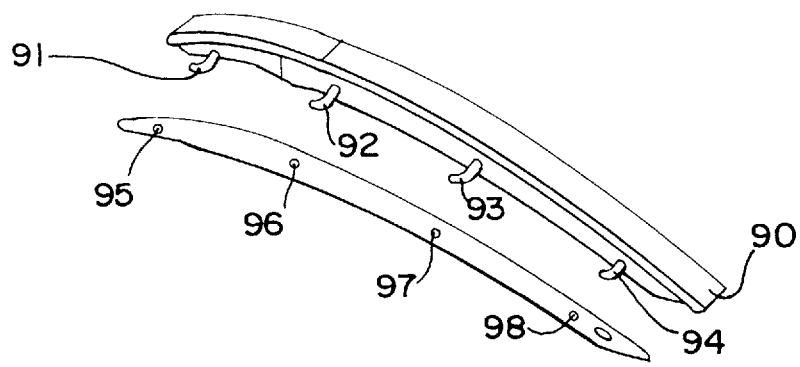
FIG. 9 is an exploded perspective view of an assembly of a third embodiment of the chain guide of the present invention.

In a third embodiment of the present invention, multiple plates are stacked and assembled. As shown in FIG. 7, the plates 71a, 71b, 71c, and 71d can be assembled with a pin 70 through the plates. Alternatively, as shown in FIG. 8, the plates 81a, 81b, 81c, and 81d, can be assembled by a weld 80 that joins the plates together. The plate assembly, 71, shown in FIG. 7 or 81, shown in FIG. 8, is attached to the plastic guide portion 90 with snap hooks 91, 92, 93, and 94, that snap directly into the plate apertures 95, 96, 97, and 98, respectively, as shown in FIG. 9.

Figure 10:
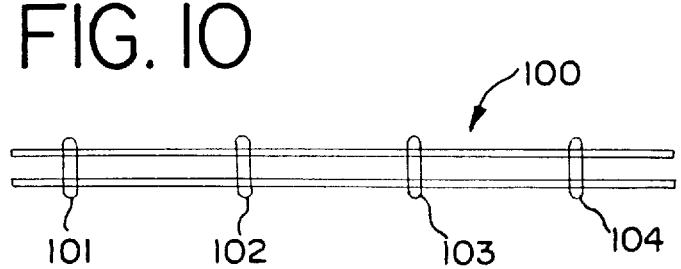
FIG. 10 is a top view of an assembly of plates of the fourth embodiment of the present invention.
Figure 11:
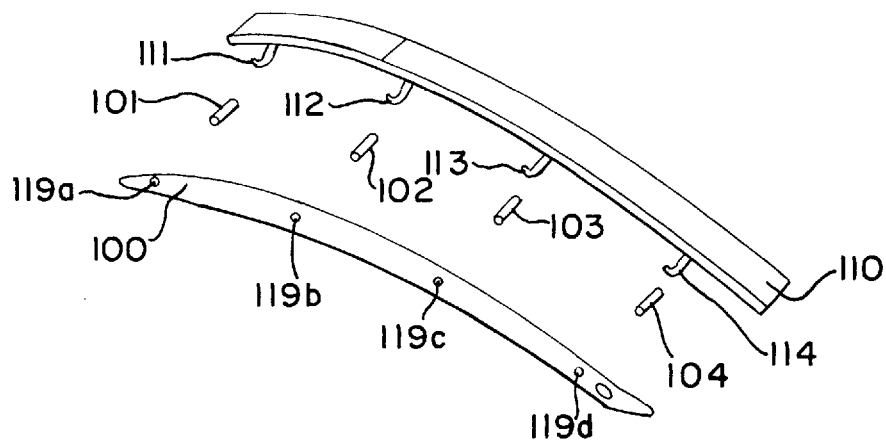
FIG. 11 is an exploded perspective view of an assembly of a fourth embodiment of the chain guide of the present invention.

A fourth embodiment of the present invention is shown in FIG. 10, where several plates are assembled together with pins 101, 102, 103, and 104. As shown in FIG. 11, pins 101, 102, 103, and 104 are fitted into the plate apertures 119a, 119b, 119c, and 119d, respectively, of the plate assembly 100. Snap hooks 111, 112, 113, and 114 of the plastic guide portion 110 slide over pins 115, 116, 117, and 118 to join the plate assembly 100 to the plastic guide portion 110.

Figure 12:
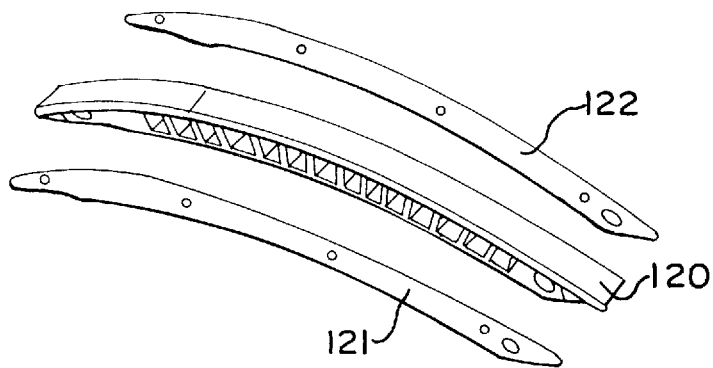
FIG. 12 is an exploded perspective view of an assembly of a fifth embodiment of the chain guide of the present invention.

FIG. 12 shows a fifth embodiment of the present invention, where plates 121 and 122 are located on each side of the plastic guide portion 120 and held in position by a mold face material, such as nylon, inserted over the plates 121 and 122. This assembly eliminates pins and hooks.

Those skilled in the art to which the invention pertains may make modifications and other embodiments employing the principles of this invention without departing from its spirit or essential characteristics, particularly upon considering the foregoing teachings. The described embodiments are to be considered in all respects only as illustrative and not restrictive and the scope of the invention is, therefore, indicated by the appended claims rather than by the foregoing description. Consequently, while the invention has been described with reference to particular embodiments, modifications of structure, sequence, materials and the like would be apparent to those skilled in the art, yet still fall within the scope of the invention.

What is claimed is:

1. A chain tensioning member, comprising:
   a guide portion having a top surface and a bottom portion extending below said top surface, said guide portion having a plastic face along said top surface that contacts a chain, said top surface being formed of a continuous piece that extends from a first end to a second end in the longitudinal direction of travel of the chain, said top surface having a center portion dividing said guide portion into a first side and a second side in the transverse direction;
   a plurality of separate plate members extending in the longitudinal direction from said first end to said second end of said guide portion, at least one of said plate members being located directly beneath said top surface on said first side of said bottom portion of said guide portion, at least another of said plate members being located directly beneath said top surface on said second side of said bottom portion of said guide portion, said plate members being formed of steel;
   a plurality of connecting members for connecting said plate members to the bottom portion of said guide portion.

2. The chain tensioning member of claim 1 wherein said plate members are flat thin laminates.

3. The chain tensioning member of claim 2 wherein the connecting members are pins and associated apertures.

4. The chain tensioning member of claim 3 wherein said connecting members include a plurality of snap hooks located on each side of the guide portion, said snap hooks sliding over and hooking onto said pins.

5. The chain tensioning member of claim 2 wherein said connecting members include a plurality of snap hooks located on each side of the guide portion, said snap hooks being snapped into elongated apertures in said second plate members.

6. The chain tensioning member of claim 2 wherein said connecting members include a plurality of posts molded onto said plastic face, said posts being inserted through elongated apertures in said plate members.

7. The chain tensioning member of claim 1 wherein the plurality of plate members are multiple plate members stacked and assembled.

8. The chain tensioning member of claim 7 wherein the plate members are assembled by inserting a plurality of pins through elongated apertures in said plate members.

9. The chain tensioning member of claim 8 wherein the connecting members are a plurality of snap hooks located on each side of the guide, said snap hooks sliding over and hooking onto said pins.

10. The chain tensioning member of claim 8 wherein the connecting members are the pins through said plate members.

11. The chain tensioning member of claim 7 wherein the plate members are connected by a weld.

12. The chain tensioning member of claim 11 wherein the connecting members are pins and associated apertures.

13. The chain tensioning member of claim 7 wherein the connecting members are snap hooks located on each side of the guide portion and snapped into elongated apertures in said plate members.

* * * * *